United States Patent [19]

Hickey, Jr. et al.

[11] Patent Number: 4,812,223

[45] Date of Patent: Mar. 14, 1989

[54] HYDROCRACKING NAPHTHAS USING MILDLY STEAMED, NOBLE METAL-CONTAINING ZEOLITE BETA

[75] Inventors: Karlton J. Hickey, Jr., Broomall, Pa.; Roger A. Morrison, Deptford, N.J.

[73] Assignee: Mobil Oil Corporation, New York, N.Y.

[21] Appl. No.: 45,487

[22] Filed: May 1, 1987

[51] Int. Cl.$^4$ .............................. C10G 47/02
[52] U.S. Cl. ........................ 208/111; 502/66
[58] Field of Search ............. 208/111, 111 MC; 502/66

[56] References Cited

U.S. PATENT DOCUMENTS

| | | | |
|---|---|---|---|
| 3,308,069 | 3/1967 | Wadlinger et al. | 252/455 |
| 3,660,270 | 5/1972 | Mason | 208/59 |
| 3,923,641 | 12/1975 | Morrison | 208/111 |
| 4,429,176 | 1/1984 | Chester et al. | 585/481 |
| 4,430,200 | 2/1984 | Shihabi | 208/120 |
| 4,448,673 | 5/1984 | Shihabi | 208/120 |
| 4,477,582 | 10/1984 | Miale | 208/120 |
| 4,500,417 | 2/1985 | Chen et al. | 208/111 |
| 4,501,926 | 2/1985 | La Pierre et al. | 208/120 |
| 4,522,929 | 6/1985 | Chester et al. | 502/71 |
| 4,550,218 | 10/1985 | Chu | 208/120 |
| 4,559,314 | 12/1985 | Shihabi | 502/71 |
| 4,568,655 | 2/1986 | Oleck | 208/216 R |
| 4,594,146 | 6/1986 | Chester et al. | 208/120 |
| 4,612,108 | 9/1986 | Angevine et al. | 208/120 |
| 4,672,149 | 6/1987 | Chester et al. | 208/120 |
| 4,678,764 | 7/1987 | Le et al. | 208/120 |

FOREIGN PATENT DOCUMENTS 0094827  11/1983  European Pat. Off. ........... 208/111

Primary Examiner—H. M. S. Sneed
Assistant Examiner—Helane Myers
Attorney, Agent, or Firm—Alexander J. McKillop; Charles J. Speciale; Dennis P. Santini

[57] ABSTRACT

The present invention relates to a method for enhancing the naphtha hydrocracking activity of a noble metal-containing zeolite beta catalyst by mildly steam treating the catalyst prior to use.

15 Claims, 1 Drawing Sheet

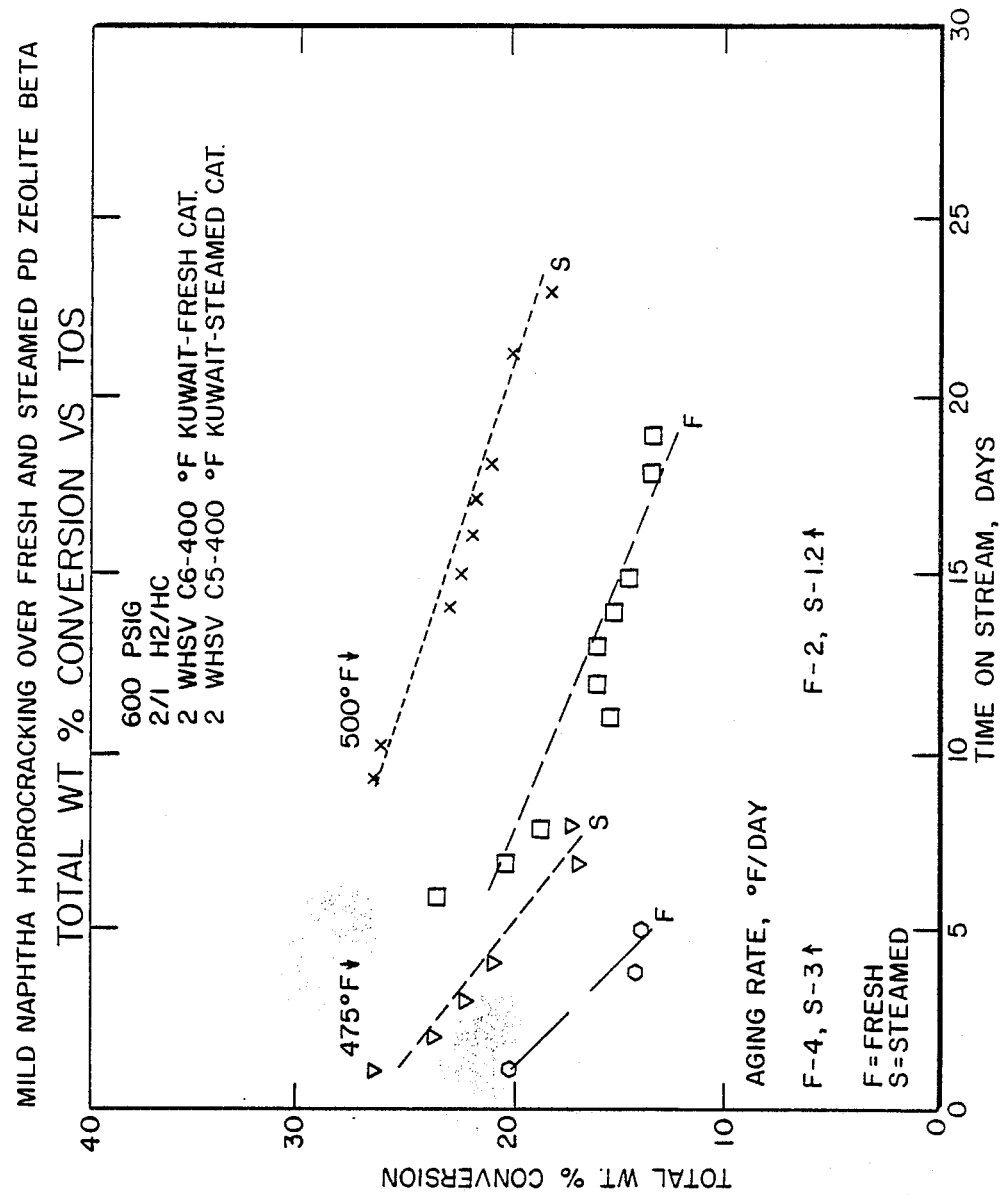

HYDROCRACKING NAPHTHAS USING MILDLY STEAMED, NOBLE METAL-CONTAINING ZEOLITE BETA

The present invention relates to a method for hydrocracking naphthas using a zeolite beta catalyst. More particularly, the invention relates to a method for enhancing the naphtha hydrocracking activitiy and stability of a zeolite beta catalyst by presteaming the fresh catalyst under mild conditions until the normal hexane cracking activity of the mildly steamed catalyst is substantially equivalent to that of the fresh, unsteamed catalyst.

Zeolite beta has been found particularly well-suited for use in a catalyst for hydrocracking naphtha under mild conditions. U.S. Pat. No. 3,923,641 to Morrison, incorporated herein by reference, discloses that $C_5+$ naphtha can be readily upgraded to a product which contains increased amounts of isobutane relative to n-butane, by hydrocracking the naphtha over zeolite beta. Enhancing isobutane yield from naphtha hydrocracking is of particular moment to oil refiners who employ isobutane in alkylation processes. In naphtha hydrocracking it would be desirable to find a zeolite beta catalyst of high naphtha hydrocracking activity which resists aging while maintaining a high selectivity for isobutane production.

Mild steaming of shape-selective zeolites has been disclosed by Chester et al in U.S. Pat. Nos. 4,429,176 and 4,522,929 incorporated herein by reference, as enhancing both the alpha activity ($\alpha$) and stability of such catalysts in acid-catalyzed reactions such as xylene isomerization. U.S. Pat. No. 4,559,314 to Shihabi, incorporated herein by reference, teaches that very highly siliceous shape-selective zeolites ($SiO_2/Al_2O_3$ molar ratio of at least about 100, preferably at least about 250), which are initially inactive, can be activated by steaming the alumina bound zeolite. Increases of over 100 percent in the alpha value are obtained with zeolites having a silica to alumina ratio of 1200:1 or more. As is well known in the art, the alpha activity gives an approximate indication of the catalytic cracking activity of the catalyst compared to a standard catalyst and it gives the relative rate constant (rate of normal hexane conversion per volume of oxide composition per unit time). It is based on the activity of the highly active silica alumina cracking catalyst taken as an alpha of 1. This test is described in U.S. Pat. No. 3,354,078 and in The Journalof Catalysis, Vol. 4, pp. 522-529, August 1965. For purposes of the present invention, however, all measurements of alpha are to be made at 1000° F. and all references to alpha are understood to refer to the value obtained when the hexane cracking is measured at 1000° F.

It has now been found that a $C_5+$ naphtha, e.g., $C_6+$ or $C_7+$ naphtha, can be hydrocracked by a method which comprises contacting the naphtha with a nobel metal-containing zeolite beta naphtha hydrocracking catalyst, whereby naphtha hydrocracking activity and stability of the catalyst are enhanced by mild steaming of said zeolite beta prior to said contacting. The noble metal associated with the hydrocracking catalyst is selected from the group consisting of Pt, Ir, Os, Pd, Rh and Ru, preferably Pd.

As taught by Chester et al in U.S. Pat. No. 4,522,929, by mildly steaminga fresh zeolite catalyst under controlled conditions the catalyst will initially exhibit an increase in normal hexanecracking activity followed by a gradual decline. When the alpha activity of the catalyst becomes substantially similar to that of the fresh, unsteamed catalyst, the steam treatment is terminated. The resulting catalyst has an alpha activity level substantialy similar to that of fresh, unsteamed catalyst although it has been mildly steamed.

In the present invention, a zeolite beta catalyst which has ben mildly steamed as described above and preferably impregnated with a hydrogenation/dehydrogenation component is found to exhibit both improved activity and stability for hydrocracking naphthas.

The present invention also relates to a method for hydrocracking a $C_5+$ naphtha which comprises contacting the naphtha with a palladium-containing zeolite beta naphtha hydrocracking catalyst comprising an alumina binder under the hydrocracking conditions noted above whereby naphtha hydrocracking activaity and stability of said catalyst is enhanced by mildly steaming said catalyst prior to said contacting.

The catalyst used in the present process comprises zeolite beta, preferably with a hydrogenation/dehydrogenation component. Zeolite beta is a known zeolite which is described in U.S. Pat. Nos. 3,308,069 and Re 28,341, to which reference is made for further details of this zeolite, its preparation and properties. The composition of zeolite beta in one of its synthesized forms is as follos; on an anhydrous basis:

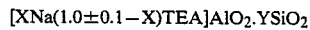

where X is less than 1, preferably less than 0.75; TEA represents the tetraethylammonium ion; Y is greater than 5 but less than 100. In the as-synthesized form, water of hydration may also be present in ranging amounts.

The sodium is derived from the synthesis mixture used to prepare the zeolite. This synthesis mixture contains a mixture of the oxides (or of materials whose chemical compositions can be completely represented as mixtures of the oxides) $Na_2O$, $Al_2O_3$, $[(C_2H_5)_4N]_2O$, $SiO_2$ and $H_2O$. The mixture is held at a temperature of about 75° C. to 200° C. until crystallization occurs. The composition of the reaction mixture expressed in terms of mole ratios, preferably falls within the following ranges:

$SiO_2/Al_2O_3$—10 to 200
$Na_2O$/tetraethylammonium hydroxide (TEAOH)—0.0 to 0.1
$TEAOH/SiO_2$—0.1 to 1.0
$H_2O/TEAOH$—20 to 75

The product which crystallizes from the hot reaction mixture is separated, suitably by centrifuging or filtration, washed with water and dried. The material so obtained may be calcined by heating in air in an inert atmosphere at a temperature usually within the range of 200° C. to 900° C., or higher. This calcination degrades the tetraethylammonium ions to hydrogen ions and removes substantially all the water. The formula of the zeolite is then:

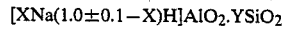

where X and Y have the values ascribed to them above. The degree of hydration is here assumed to be zero, following the calcination.

If this Na-form zeolite is subjected to aqueous exchange, the sodium may be replaced by other cations to give a zeolite of the formula (anhydrous basis):

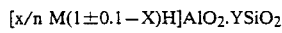

$$[x/n\ M(1\pm0.1-X)H]AlO_2 \cdot YSiO_2$$

where X, Y have the values ascribed to them above and n is the valence of the cation. The synthesized alkali metal form of the zeolite beta may be converted to the hydrogen form, generally by intermediate formation of the ammonium form as a result of ammonium ion exchange and calcination of the ammonium form to yield the hydrogen form. In addition to the hydrogen form, other forms of the zeolite may be made by replacing the alkali metal with other suitable ions of Groups IB to VIII of the Periodic Table, including, by way of example, nickel, palladium, platinum, or rare earth metals. Exchange may be carried out in accordance with any of the well known techniques.

The as-synthesized sodium form of the zeolite may be subjected to exchange directly without intermediate calcination to give a material of the formula (anhydrous basis):

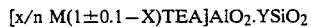

$$[x/n\ M(1\pm0.1-X)TEA]AlO_2 \cdot YSiO_2$$

where X, Y, n and M are as described above. This form of the zeolite may then be converted partly to the hydrogen form by calcination, e.g., at 200° C. to 900° C., or higher. The completely hydrogen form may be made by ammonium exchange followed by calcination in air or an inert atmosphere such as nitrogen. Exchange may be carried out in the manner disclosed in U.S. Pat. Nos. 3,308,069 and Re. 28,341.

Because tetraethylammonium hydroxide can be used in its preparation, zeolite beta may contain occluded tetraethylammonium ions (e.g., as the hydroxide or silicate) within its pores in addition to that required by electroneutrality and indicated in the calculated formulae given in this specification. The formulae, of course, are calculated using one equivalent of cation required per Al atom in tetrahedral coordination in the crystal lattice.

Zeolite beta, in addition to possessing a composition as defined above, may also be characterized by its X-ray diffraction data which are set out in U.S. Pat. Nos. 3,308,069 and Re. 28,341. The significant d values (Angstroms, radiation: K alpha doublet of copper, Geiger counter spectrometer) are as shown in Table 1 below:

TABLE 1

| d Values of Reflections in Zeolite Beta |
|---|
| 11.40 ± 0.2 |
| 7.40 ± 0.2 |
| 6.70 ± 0.2 |
| 4.25 ± 0.1 |
| 3.97 ± 0.1 |
| 3.00 ± 0.1 |
| 2.20 ± 0.1 |

The metal may be incorporated into the catalyst by any suitable method such as impregnation or exchange onto the zeolite. The metal may be incorporated in the form of a cationic, anionic or neutral complex such as $Pd(NH_3)_4^{2+}$ or $Pt(NH_3)_4^{2+}$. Cationic complexes of this type will be found particularly convenient for exchanging metals onto the zeolite. The amount of the hydrogenation-dehydrogenation component is suitably from 0.01 to 10 percent by weight, normally 0.1 to 5 percent by weight of the catalyst, although this will, of course, vary with the nature of the component.

It may be desirable to incorporate the catalyst in another material resistant to the temperature and other conditions employed in the process. Such matrix materials include synthetic or natural substances as well as inorganic materials such as clay, silica and/or metal oxides. The latter may be either naturally occurring or in the form of gelatinous precipitates or gels including mixtures of silica and metal oxides. Naturally occurring clays which can be composited with the catalyst include those of the montmorillonite and kaolin families. These clays can be used in the raw state as originally mined or initially subjected to calcination, acid treatment or chemical modification.

The catalyst may be composited with a porous matrix material, such as alumina, silica, silica-alumina, silica-magnesia, silica-zirconia, silica-thoria, silica-berylia, silica-titania as well as ternary compositions, such as silica-alumina-thoria, silica-alumina-zirconia, silica-alumina-magnesia, and silica-magnesia-zirconia. The matrix may be in the form of a cogel with the zeolite. The relative proportions of zeolite component and inorganic oxide gel matrix may vary widely with the zeolite content ranging from between 1 to 99, more usually 5 to 80, preferably about 35 percent by weight of the composite. The matrix may itself possess catalytic properties, generally of an acidic nature.

Preferably, the catalyst of the present invention is prepared by compositing the as-synthesized zeolite with the binder and the resulting composite is extruded, dried and then calcined. After calcination the composite is ammonium—exchanged. Although mild steam treatment can be carried out at any stage, preferably, the mildsteam treatment of the present invention is carried out on the ammonium—exchanged product which is thereafter metal ion-exchanged, dried and then calcined.

The mild steaming is carried out under conditions of temperature, time and steam partial pressure controlled so as to produce a mildly steamed catalyst with an alpha activity substantially the same as the alpha activity of the fresh catalyst and no more than 25% below the initial activity of said fresh catalyst. Suitable conditions can be empirically determined.

The resulting mildly steamed catalyst is particularly suited for use in mild hydrocracking of naphtha. Steaming serves to enhance catalyst stability, particularly when the catalyst has been regenerated. Moreover, the mildly steamed catalyst exhibits an enhanced naphtha hydrocracking activity which surpasses otherwise equivalent unsteamed catalysts of similar or evenhigher alpha (hexane cracking) activity.

The catalyst of this invention may be prepared in any desired physical form. Preferably, it is used in the form of small fragments of a size best suited for operation under the specific conditions existing. Thus, the catalyst may be in the form of finely divided powder or may be in the form of pellets of 1/16 inch to ⅛ inch size, for example. The catalyst can be otained by pelleting, casting, or extruding in accordance with well known techniques.

The hydrocracking process using zeolite beta can be run under a variety of conditions. The pressure may vary from 0 to about 2,000 psig, but will preferably be from about 300 to about 800 psig. The temperature of reaction is preferably from about 450° to about 550° F.

but may range from about 400° to about 650° F. The hydrogen to hydrocarbon ratio, in a mole basis, can run from 1 to 1 to about 15 to 1, preferably from about 3 to 1 to about 7 to 1. Weight hour space velocities (WHSV) may be from about 0.5 to about 20, preferably from about 1 to about 3.

The invention is illustrated by the following Examples which are not to be construed as limitingthe claimed invention in any way.

EXAMPLE 1

Preparation of Mildly Steamed Palladium Zeolite Beta

As-synthesized zeolite beta having a silica to alumina molar ratio of about 40 was composited with alumina to form a 65 wt% zeolite beta/35 wt% $Al_2O_3$ mixture which was formed into one-sixteenth inch diameter extrudate and dried at 250° F. overnight. The dried extrudate was calcined for 3 hours at 1000° F. in 3 v/v/min $N_2$ and then calcined for 3 hours at 1000° F. in 3 v/v/min air. Calcining temperature was reached at a rate of 5° F./min. The calcined product was exchanged twice for 1 hour each time at rooom temperature in 5 ml/g of circulating 1N $NH_4NO_3$ and then water washed and dried at 250° F. overnight. The resulting dried product was steamed for one hour at 800° F. at 0 psig steam at 10 v/v/min. Steaming temperature was reached at a rate of 5° F./minute in 10/v/v/min air flow.

The mildly steamed catalyst was impregnated by the incipient wetness technique with $Pd(NH_3)_4(NO_3)_2$ dissolved in 1 Normal $NH_4NO_3$. The impregnted catalyst was allowed to stand for 5 hours at room temperature and thereafter was dried at 250° F. overnight. The dried product was activated by calcining for three hours at 660° F. in 5 v/v/min air flow. Calcination temperature was reached at a rate of 2° F./min.

The alpha of the base catalyst (measured before mild steaming) was about 260. After the mild steaing the alpha value was measured at about 273. The finished catalyst contained about 0.69 wt.% palladium.

EXAMPLE 2

Preparation of Unsteamed Palladium Zeolite Beta

As-synthesized zeolite beta having a silica to alumina molar ratio of about 40 was composited with alumina to form a 65 wt% zeolite beta/35 wt% $Al_2O_3$ mixture which was formed into one-sixteenth inch diameter cylindrical extrudate and dried at 250° overnight. The dried extrudate was calcined for 3 hours at 1000° F. in 3 v/v/min $N_2$ and then calcind for 3 hours at 1000° F. in 3 v/v/min air. Calcining temperature was reached at a rate of 5° F./min. The calcined product was exchanged twice for 1 hour each time at room temperature in 5 ml/g of circulating 1N $NH_4NO_3$ and then water washed and dried at 250° F. overnight. The resulting dried product was calcined for 3 hours at 1000° F. in 3 v/v/min air. Calcining temperature was reached at a rate of 3° F./minute.

The calcined catalyst was impregnated by the incipient wetness technique with $Pd(NH_3)_4(NO_3)_2$ dissolved in 0.5 Normal $NH_4NO_3$. The impregnated catalyst was allowed to stand for 5 hours at room temperature and thereafter was dried at 250° F. overnight. The dried product was activated by calcining for three hours at 660° F. in 5 v/v/min air flow. Calcination temperature was reachedat a rate of 2° F./min.

The alpha of the calcined catalyst before palladium addition was 326. The finished catalyst containd about 0.65 wt.% palladium.

EXAMPLE 3

Mild Naphtha Hydrocracking With Steamed and Unsteamed Palladium Zeolite Beta Catalysts The catalysts of Examples 1 and 2 were reduced in hydrogen at 900° F. and then presulfided with 2 percent by volume $H_2S$ in hydrogen at 700° F. until $H_2S$ breakthrough and then used to mildly hydrocrack $C_5$-400° F. Kuwait Naphtha and $C_6$-400° F. Kuwait Naphtha respectively. Since all of the conversion is from the $C_5+$ fraction, the presence of $C_5$ hydrocarbons is not believed to affect the results. The conversions were carried out at a hydrogen pressure of 600 psig, a 2 to 1 hydrogen to hydrocarbon mole ratio and a weight hourly space velocity of 2. The results of the conversion at temperatures of 475° F., and 500° F. are depicted in the Figure which depicts the plotting of total weight percent conversion versus time on stream(TOS) for both fresh (F) and steamed (S) catalysts. The Figure shows that at 475° F. the initial total weight percent conversion for the mildly steamed catalyst was about 26 with an aging rate of about 3° F./day while the fresh catalyst had an initial total weight percent conversion of about 20 and an aging rate of 4° F./day. Similar results were obtained at 500° F.

It is claimed:

1. A method for hydrocracking a naphtha which comprises contacting said naphtha with a noble metal-containing zeolite beta naphtha hydrocracking catalyst at a pressure of about 0 to about 2000 psig, a temperature of about 400° to about 650° F., a hydrogen or hydrocarbon molar ratio of about 0.1 to 1 to about 15 to 1 and a weight hourly space velocity of about 0.5 to about 20, whereby naphtha hydrocracking activity of said catalyst is enhanced by mild steaming of said zeolite beta catalyst prior to said contacting, said mild steaming being accomplished by steaming said zeolite catalyst in its fresh state under controlled conditions of temperature, time and steam partial pressure so as to initially increase the alpha activity of said catalyst and produce a steamed catalyst having a peak alpha activity, and subsequently reduce the alpha activity from said peak alpa activity to an alpha activity substantially the same as the alpha activity of said fresh catalyst and no more than 25% below the initial alpha activity of said fresh catalyst.

2. The method of claim 1 wherein said mild steaming enhances naphtha hydrocracking catalyst stability.

3. The method of claim 1 wherein said noble metal is selected from the group consisting of Pt, Ir, Os, Pd, Rh and Ru.

4. The method of claim 1 wherein said noble metal comprises Pt.

5. The method of claim 1 wherein said noble metal comprises Pd.

6. The method of claim 1 wherein said steaming occurs prior to incorporation of said noble metal.

7. The method of claim 1 wherein said presssure ranges from about 300 to about 800 psig, said temperature ranges from about450° to 550° F., said hydrogen to hydrocarbon molar ratio ranges from about 3 to 1 to about 7 to 1 and said weight hourly space velocity ranges from about 1 to about 3.

8. The method of claim 1 wherein said catalyst contains an inorganic oxide binder.

9. The method of claim 8 wherein said inorganic oxide binder is selected from the group consisting of alumina, silica and silica-alumina.

10. The method of claim 8 wherein said inorganic oxide binder is alumina.

11. The method of claim 1 wherein said naphtha is a $C_5+$ naphtha.

12. The method of claim 1 wherein said naphtha is a $C_6+$ naphtha.

13. The process of claim 1 wherein said noble metal comprises from about 0.1 to about 10 weight percent of said catalyst.

14. A method for hydrocracking a $C_5+$ naphtha which comprises contacting said naphtha with a palladium-containing zeolite beta naphtha hydrocracking catalyst comprising an alumina binder, at a pressure ranging from about 300 to about 800 psig, a temperature ranging from about 450° to about 550° F., a hydrogen to hydrocarbon molar ratio ranging from about 3 to 1 to about 7 to 1 and a weight hourly space ratio (WHSV) ranging from about 1 to about 3, whereb naphtha hydrocracking activity of said catalyst is enhanced by mild steaming of said catalyst prior to said connecting, said mild steaming being accomplished by steaming said zeolite catalyst in its fresh state under controlled conditionsof temperature, time and steam partial pressure so as to initially increase the alpha activity of said catalyst and produce a steamed catalyst having a peak alpha activity, and subsequently reduce the alpha activity from said peak alpha activity to an alpha activity substantially the same as the alpha activity of said fresh catalyst and no more than 25% below the initial alpha activity of said fresh catalyst.

15. The method of claim 14 wherein said mild steaming enhances naphtha hydrocracking catalyst stability.

* * * * *